US009769088B2

(12) United States Patent
Duda (10) Patent No.: US 9,769,088 B2
(45) Date of Patent: Sep. 19, 2017

(54) METHOD AND SYSTEM FOR VTEP REDUNDANCY IN A MULTICHASSIS LINK AGGREGATION DOMAIN (71) Applicant: Arista Networks, Inc., Santa Clara, CA (US)

(72) Inventor: Kenneth James Duda, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 23 days.

(21) Appl. No.: 14/447,941

(22) Filed: Jul. 31, 2014

(65) Prior Publication Data
US 2016/0036728 A1    Feb. 4, 2016

(51) Int. Cl.
H04L 12/28        (2006.01)
H04L 12/947       (2013.01)
H04L 12/46        (2006.01)
H04L 12/741       (2013.01)

(52) U.S. Cl.
CPC .......... H04L 49/25 (2013.01); H04L 12/4633 (2013.01); H04L 12/4641 (2013.01); H04L 45/74 (2013.01)

(58) Field of Classification Search
USPC ................ 370/218–231, 254–357, 392–401; 709/217–241
See application file for complete search history.

(56) References Cited

U.S. PATENT DOCUMENTS

| 7,839,843 | B2* | 11/2010 | Dontu ..................... H04L 12/46 370/389 |
| 8,472,447 | B2* | 6/2013 | Humphries ........... H04L 12/185 370/392 |
| 8,730,963 | B1* | 5/2014 | Grosser, Jr. ........... H04L 12/462 370/219 |
| 8,819,267 | B2* | 8/2014 | Anumala ............ H04L 12/4625 709/230 |
| 8,832,279 | B2* | 9/2014 | Baba ................... H04L 12/4633 709/203 |
| 2012/0230325 | A1 | 9/2012 | Haddock |

(Continued)

OTHER PUBLICATIONS

European Extended Search Report in corresponding EP Application No. EP15179368, dated Nov. 20, 2015 (5 pages).

Primary Examiner — Man Phan
(74) Attorney, Agent, or Firm — Chamberlain Hrdlicka (57) ABSTRACT A method for transmitting MAC frames. The method includes receiving, by a first switch in the MLAG domain, a first media access control (MAC) frame from an external device, wherein the external device is directly connected to the first switch, where the MLAG domain consists of the first switch and the second switch. The method further includes making a first determination that the external device is not a singly-connected external device and based on the first determination, encapsulating the first MAC frame in a first VXLAN frame using a first virtual tunnel endpoint (VTEP), where the first VXLAN frame comprises a virtual VTEP Internet Protocol (IP) address, where the virtual VTEP IP address is associated with the MLAG domain. The method further includes transmitting the first VXLAN frame to an IP fabric, where the first switch is directly connected to the IP fabric.

20 Claims, 9 Drawing Sheets (56) References Cited

U.S. PATENT DOCUMENTS

| | | | |
|---|---|---|---|
| 2012/0314715 A1* | 12/2012 | Janardhanan | H04L 45/586 370/402 |
| 2013/0287022 A1 | 10/2013 | Banavalikar et al. | |
| 2014/0036924 A1* | 2/2014 | Christenson | H04L 12/4641 370/395.53 |
| 2014/0112349 A1 | 4/2014 | Moreno et al. | |
| 2014/0126352 A1* | 5/2014 | Tatsumi | H04L 49/25 370/220 |
| 2015/0009992 A1* | 1/2015 | Zhang | H04L 49/354 370/392 |
| 2015/0049761 A1* | 2/2015 | Kumagai | H04L 12/1863 370/390 |
| 2015/0063353 A1* | 3/2015 | Kapadia | H04L 45/745 370/392 |
| 2015/0319083 A1* | 11/2015 | Grosser, Jr. | H04L 45/245 370/218 |

* cited by examiner

METHOD AND SYSTEM FOR VTEP REDUNDANCY IN A MULTICHASSIS LINK AGGREGATION DOMAIN

BACKGROUND

It is critical that network infrastructure be resilient in order to ensure that data is able to be communicated on the network infrastructure. Network engineers typically take various approaches for ensuring that the network infrastructure continues to enable data communication even when various portions of the network infrastructure are not operating correctly.

SUMMARY

In general, in one aspect, the invention relates to a non-transitory computer readable medium comprising instructions, which when executed by at least one processor perform a method in a multichassis link aggregation (MLAG) domain. The method includes receiving, by a first switch in the MLAG domain, a first media access control (MAC) frame from an external device, wherein the external device is directly connected to the first switch, wherein the MLAG domain consists of the first switch and the second switch, making a first determination that the external device is not a singly-connected external device, based on the first determination, encapsulating the first MAC frame in a first VXLAN frame using a first virtual tunnel endpoint (VTEP), wherein the first VXLAN frame comprises a virtual VTEP Internet Protocol (IP) address, wherein the virtual VTEP IP address is associated with the MLAG domain, and transmitting the first VXLAN frame to an IP fabric, wherein the first switch is directly connected to the IP fabric.

In general, in one aspect, the invention relates to a method for transmitting MAC frames. The method includes receiving, by a first switch in the MLAG domain, a first media access control (MAC) frame from an external device, wherein the external device is directly connected to the first switch, wherein the MLAG domain consists of the first switch and the second switch, making a first determination that the external device is not a singly-connected external device, based on the first determination, encapsulating the first MAC frame in a first VXLAN frame using a first virtual tunnel endpoint (VTEP), wherein the first VXLAN frame comprises a virtual VTEP Internet Protocol (IP) address, wherein the virtual VTEP IP address is associated with the MLAG domain, and transmitting the first VXLAN frame to an IP fabric, wherein the first switch is directly connected to the IP fabric.

In general, in one aspect, the invention relates to a multichassis link aggregation (MLAG) domain. The MLAG domain includes a first switch comprising a first virtual tunnel endpoint associated with a first VTEP Internet Protocol (IP) address, a second switch comprising a second VTEP associated with a second VTEP IP address and a virtual VTEP associated with a virtual VTEP IP address. The first switch is configured to: receive, a first media access control (MAC) frame from an external device, wherein the external device is directly connected to the first switch, make a first determination that the external device is not a singly-connected external device, based on the first determination, encapsulate the first MAC frame in a first VXLAN frame using a first VTEP, wherein the first VXLAN frame comprises the virtual VTEP IP address, and transmit the first VXLAN frame to an IP fabric, wherein the first switch is directly connected to the IP fabric.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4D, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to implementing redundant virtual tunnel endpoints (VTEPs) in an MLAG domain. More specifically, embodiments of the invention relates to having at least three VTEPs in an MLAG domain, where each MLAG Peer in the MLAG domain is associated with its own VTEP and the MLAG domain as a whole is associated with at least one virtual VTEP.

In one or more embodiments of the invention, MLAG is a switch behavior where two switches cooperate to provide the illusion of a single switch from the point of view of any externally connected device. The two switches are called MLAG peers, their union is called the MLAG domain, and the link or links directly connecting them are called the peer link or links. In one embodiment, the switches cooperate to provide the illusion of a single layer-2 Ethernet switch such that external devices may connect using link aggregation groups (LAGs) made up of a set of links where one subset of the links terminates on the first switch, and the remaining links terminate on the second switch. One skilled in the art will recognize that maintaining this illusion requires several distinct types of coordination, including Spanning Tree Protocol (STP) coordination, Link Aggregation Control Protocol (LACP) coordination, MAC Address Learning coordination, and IGMP Snooping coordination.

Figure 1A:
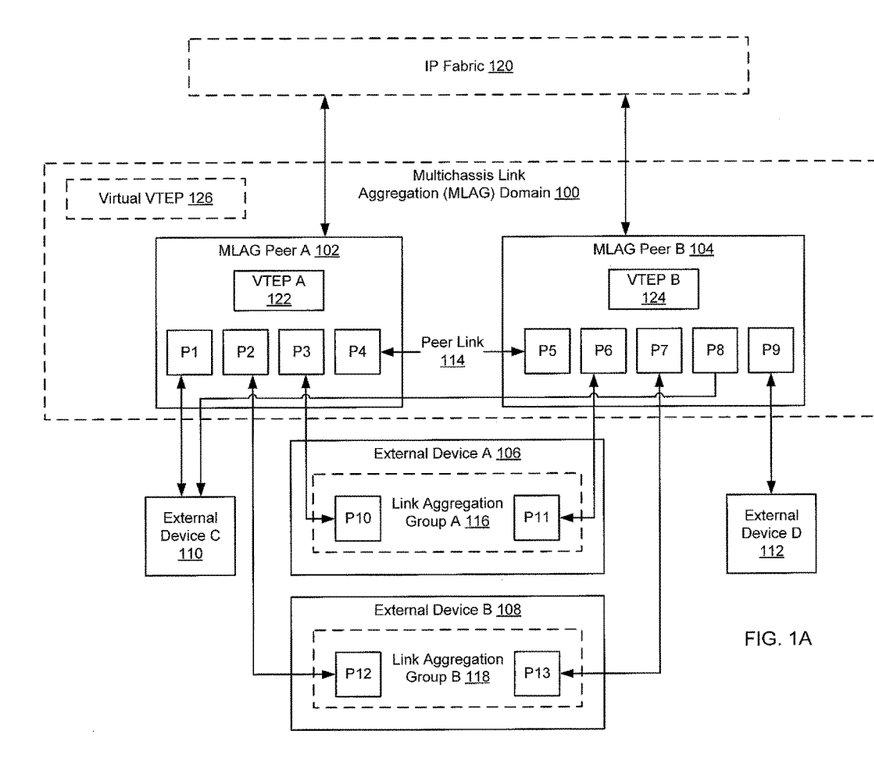
FIGS. 1A and 1B show various views of a system in accordance with one or more embodiments of the invention.

FIG. 1A shows a system in accordance with one or more embodiments of the invention. The system includes an MLAG domain (100) and a number of external devices (106, 108, 110, 112). Each of these components is described below.

In one embodiment of the invention, the MLAG domain (100) includes a pair of MLAG peers (102, 104), where each of the MLAG peers (102, 104) is a switch. In one embodiment of the invention, a switch is a physical device that includes persistent storage, memory (e.g., Random Access Memory), one or more processors, and two or more physical ports (e.g., P1-P9). Each port may be connected to either: (i) an MLAG peer, (ii) an external device (106, 108, 110, 112), or (iii) the IP fabric (120). Ports connected to an MLAG peer may be referred to as peer ports while ports not connected to the MLAG peer may be referred to as non-peer ports.

With respect to the peer ports, each MLAG peer may include one or more peer ports, where the peer ports on one MLAG peer are connected (e.g., via a wired connection) to the peer ports on the other MLAG peer. The result is one or more physical links between the MLAG peers. These links may be collectively referred to as a peer link (114). The peer link (114) may be established and/or active when at least one physical link that is part of the peer link is active. The physical link is considered to be active when peer ports on each side of the physical link are active.

Continuing with the discussion of a switch, each switch is configured to receive packets via the non-peer ports and determine whether to (i) drop the packet, (ii) process the packet as part of a layer-2 control protocol (e.g., Spanning Tree Protocol (STP), Link Aggregation Control Protocol (LACP), Internet Group Management Protocol (IGMP)) and/or a routing protocol (e.g., Open Shortest Path First (OSPF) protocol, Routing Information Protocol (RIP), etc.); or (iii) send the packet out over another one of the ports on the switch based on the processing in (ii). The switch may use the destination media access control (MAC) address in the received packet along with a forwarding table to determine out of which port to send the packet and/or the destination internet protocol (IP) address in the received packet along with a routing table to determine out of which port to send the packet. In one embodiment of the invention, the persistent storage in the switch may include any non-transitory computer readable medium that includes instructions, which when executed by the one or more processors in the switch, enable the switch to perform the functions described in this application (see e.g., FIGS. 2-4D).

In one embodiment of the invention, an external device may be (i) a switch, (ii) a router, (iii) a computer system, or (iv) any other device that is able to connect to at least one port in the MLAG domain. The computer system (with a processor, memory, and persistent storage) may correspond to any type of system that is configured to send and receive packets.

In one embodiment of the invention, each external device may be a singly-connected device or a dually-connected device. A singly-connected device is only connected to a single port on one of the MLAG peers (see e.g., 112). A dually-connected device is connected to at least one port on each of the MLAG peers in the MLAG domain (e.g., 106, 108, 110). If an external device is dually-connected, then the ports on the external device that are connected to the MLAG domain in order to make the external device a dually-connected device are collectively referred to as a link aggregation group (e.g., 116, 118).

In one embodiment of the invention, to external devices that are dually-connected devices, the MLAG domain appears as a single switch. For example, from the perspective of external device A (106) and external device B (108), the MLAG domain appears as a single switch with a media access control (MAC) address (which is different than the MAC addresses of the MLAG peer A (102) and MLAG peer B (104)) and ports P1-P9. Further, based on the above, external device A (106) operates as if port P10 and P11 are connected to the same switch. Similarly, external device B (108) operates as if port P12 and P13 are connected to the same switch.

The MLAG peers in the MLAG domain share forwarding table information via the peer link such that the MLAG peers have synchronized forwarding tables. More specifically, with respect to the forwarding tables, when a packet is received on a port in the MLAG domain and there is no entry in the forwarding table on the MLAG peer that received the packet, the MLAG peer that received the packet is responsible for generating the forwarding table entry. Specifically, the MLAG peer (i) determines whether the packet was received from a port that is part of a link aggregation group (e.g., 116, 118); (ii) if the packet was received from a port that is associated with the link aggregation group, the packet is forwarded out all ports (including via one peer port if there are any singly-connected external devices on the other MLAG peer) on the MLAG peer except the ports on the MLAG peer associated with the link aggregation group; and (iii) once the information for the forwarding table entry is obtained (e.g., which port in the MLAG peer is associated with the destination MAC address in the packet), the MLAG peer stores this information in its forwarding table and provides the information to the other MLAG peer in the MLAG domain. The other MLAG peer may use this information along with link aggregation group information (if present) to generate a forwarding table entry.

If in (i) the packet was not received from a port that is part of a link aggregation group, then the MLAG peer proceeds to generate a forwarding table entry in the same manner that a single switch would generate a forwarding table entry. Further, with respect to (ii), those skilled in the art will appreciate that packets are sent out to all ports may be subject to VLAN membership tests, STP topology tests, and/or one or more access control lists (ACLs).

The following describes an example of generating forwarding table entries for MLAG peers in the MLAG domain. Turning to the example, assume that a packet (with destination MAC A) is received from external device B (108) on P7 of MLAG peer B and that there is no forwarding table entry for MAC A. MLAG peer B sends the packet out over P6, P8, and P9. MLAG peer B subsequently determines that the packets with destination MAC A (corresponding to external device A) should be forwarded out P6. This information is stored in a forwarding table entry in MLAG peer B (104). This information is also forward to MLAG peer A (102). Upon receipt, MLAG peer A creates a forwarding entry that includes MAC A and P3. MLAG peer A is able to create this forwarding entry because MLAG peer A (102) includes information that indicates P3 and P6 are in a link aggregation group.

While the MLAG domain appears as a single switch to external devices that are connected to either of the peers in the MLAG domain, from the perspective of IP routing, each of the MLAG peers implements its own routing functionality and maintains its own routing table. As a result, an IP Packet received by a first MLAG peer in the MLAG domain may be routed to a second MLAG peer in the MLAG domain if the routing table entries indicate that the second MLAG peer is the next hop (as determined by the routing protocol implemented in the first MLAG peer). In one embodiment of the invention, each of the MLAG Peers in the MLAG domain implements the same routing protocol. Alternatively, the MLAG peers in the MLAG domain may implement different routing protocols.

In one embodiment of the invention, each of the MLAG peers implements a VTEP, e.g., MLAG Peer A implements VTEP A (122) and MLAG Peer B (124) implements VTEP B. Each of the VTEPs includes its own unique IP address, e.g., the IP address of the MLAG peer upon which it is executing. In addition, the MLAG domain (100) is associated with a Virtual VTEP (126), where the virtual VTEP is associated with an IP address that is distinct from the IP addresses assigned to VTEP A and VTEP B. The functionality of the Virtual VTEP is implemented by both of the MLAG peers in the MLAG domain.

In one embodiment of the invention, each VTEP includes functionality to process received VXLAN packets in accordance with the VXLAN protocol, where the processing includes, but is not limited to, encapsulating MAC frames in VXLAN frames and decapsulating MAC frames from VXLAN frames. In one embodiment of the invention, the VTEPs implement the VXLAN protocol a version of which is defined in the document entitled "VXLAN: A Framework for Overlaying Virtualized Layer 2 Networks over Layer 3 Networks" version 09 dated Jul. 18, 2014. The VXLAN protocol is hereby incorporated by reference in its entirety. The invention is not limited to a particular version of VXLAN.

Each non-virtual VTEP may be implemented as a combination of software and storage (volatile and/or persistent storage). Alternatively, each non-virtual VTEP may be implemented as a combination of hardware and storage (volatile and/or persistent storage). In another alternative, each non-virtual VTEP may be implemented as a combination of hardware and software. The virtual VTEP may be implemented by the MLAG peers using the same hardware and/or software used to implement the non-virtual VTEPs in the MLAG domain.

In one embodiment of the invention, each of the MLAG peers is connected to the IP Fabric (120). In one embodiment of the IP Fabric is any combination of interconnected network devices (e.g., routers and/or switches) that implement VTEPs, implement a VXLAN protocol, and/or are able to route VXLAN frames. The IP Fabric enables external devices connected to the MLAG domain to communicate using VXLAN with other remote devices (not shown) that are connected to the IP Fabric.

In one or more embodiments of the invention, the network devices in the IP Fabric are able to send VXLAN frames to the aforementioned VTEPs using IP routes that may be injected into the IP Fabric using, for example, Interior Gateway Protocol. In such cases, a given network device in the IP Fabric may include the following route entries in its IP routing table: (i) an IP route for VTEP A that includes the VTEP A IP address, (ii) an IP route for VTEP B that includes the VTEP B IP address, (iii) an IP route for the Virtual VTEP in which the next hop is MLAG Peer A, and (iv) an IP route for the Virtual VTEP in which the next hop is MLAG Peer B. In one embodiment of the invention, the network devices in the IP Fabric may use, for example, Equal Cost Multipathing (ECMP) to determine the next hop when the destination IP address in VXLAN frame is the Virtual VTEP IP address.

The invention is not limited to the system configuration shown in FIG. 1A.

Figure 1B:
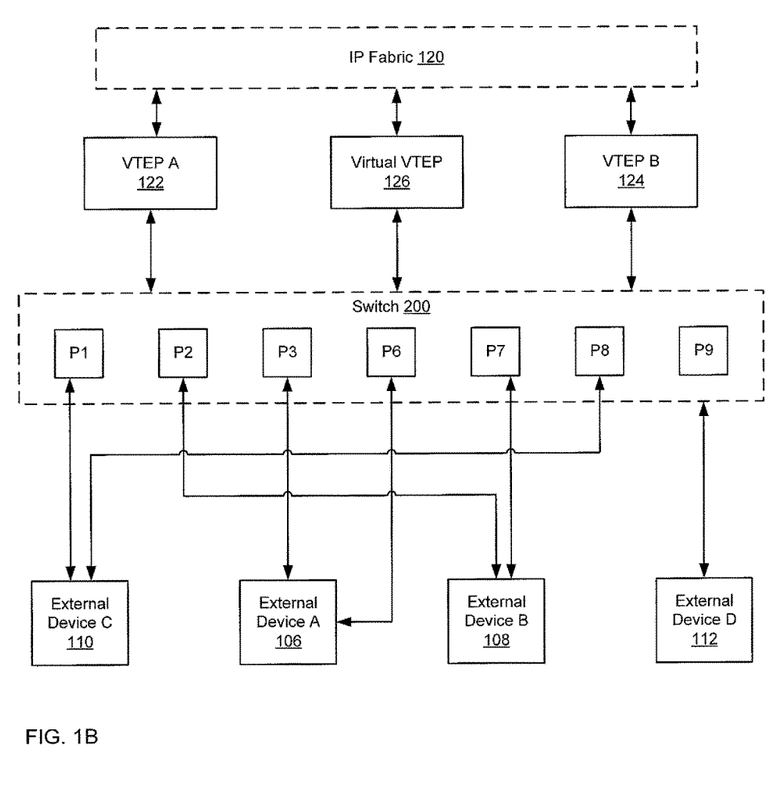

FIG. 1B shows a logical representation of the MLAG domain in accordance with one or more embodiments of the invention. More specifically, FIG. 1B shows the logical view of the MLAG domain form the perspective of the external devices (106, 108, 110, 112) and the IP Fabric (120). From the perspective of the external devices, there appears to be a single switch (200). Further, the perspective of the IP fabric (120), there appears to be three VTEPs: VTEP A (122), VTEP B (124), and the Virtual VTEP (126).

Figure 2:
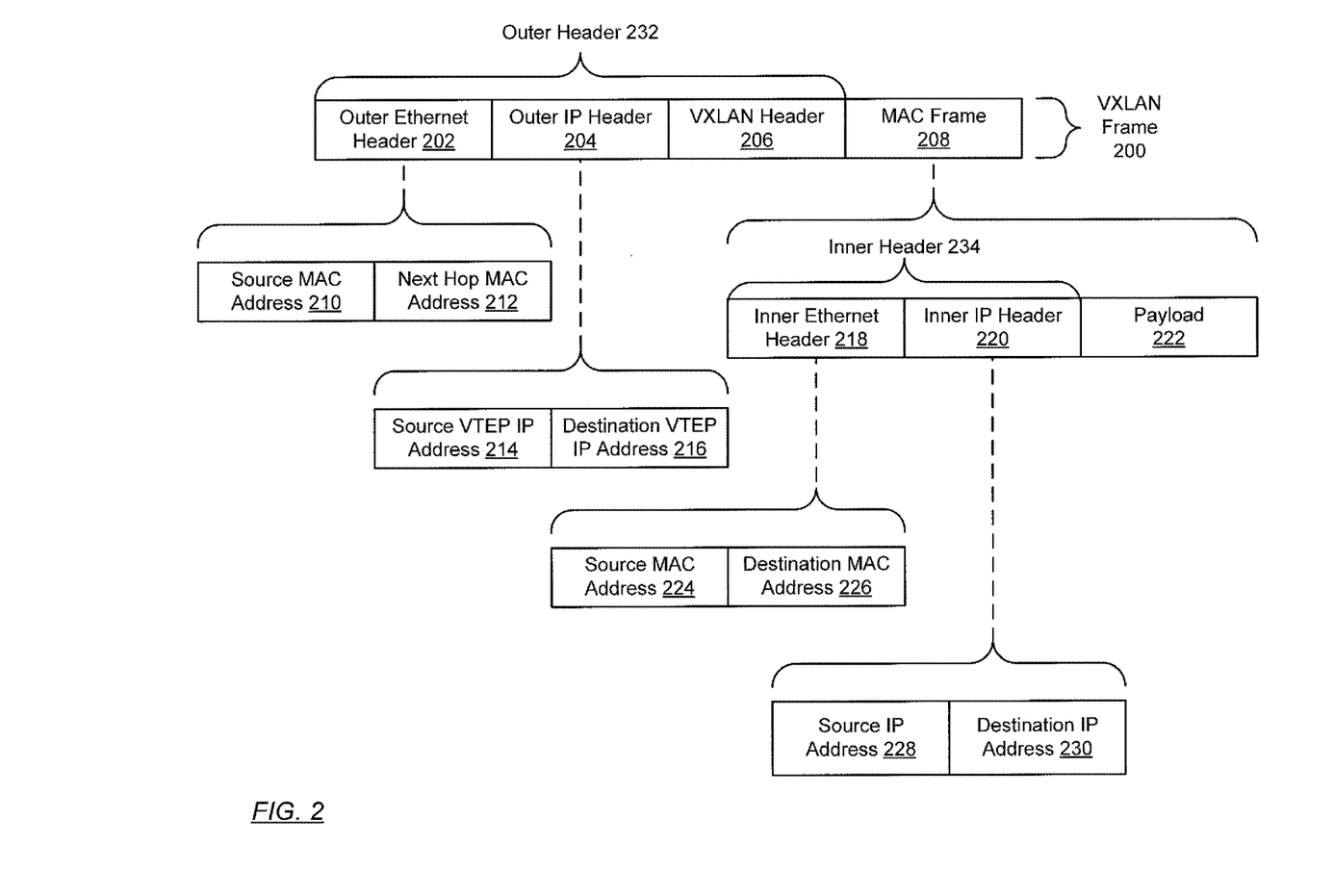
FIG. 2 shows a VXLAN Frame in accordance with one or more embodiments of the invention.

FIG. 2 shows a VXLAN frame in accordance with one or more embodiments of the invention. The VXLAN frame (200) includes: (i) a MAC frame (208), (ii) a VXLAN header (206), (iii) an outer IP header (204), and (iv) an outer Ethernet header (202). Each of the aforementioned components is described below.

In one embodiment of the invention, the MAC frame (208) is generated by a source host or virtual machine and may include an inner header (234) and a payload (222). The payload (222) may include the content that the source host or virtual machine is attempting to transmit to the destination host or virtual machine. The inner header (234) includes an inner Ethernet header (218) and an inner IP header (220). The inner Ethernet header (218) includes a source MAC address (224), a destination MAC address (226). The inner IP header (220) includes a source IP address (228) and a destination IP address (230). The MAC frame may include other information/content without departing from the invention.

In one embodiment of the invention, the VXLAN header (206) may include, but is not limited to, a virtual network identifier (VNI). The VNI scopes the MAC frame (208) originated by the host or virtual machine such that the MAC frame (208) may only be received by destination servers or virtual machines associated (via a VTEP) with the same VNI. The VXLAN header may include other information/content without departing from the invention.

In one embodiment of the invention, the outer Ethernet header (202) and the outer IP header (204) are used to route the VXLAN frame from the source VTEP to the destination VTEP. To this end, the outer Ethernet header (302) includes the source MAC address (210) and the next hop MAC address (212) and the outer IP header (204) includes the source VTEP IP address (214) and the destination VTEP IP address (216). The aforementioned mentioned components may include other information/content without departing from the invention. The outer Ethernet header (202), the Outer IP header (204), and the VXLAN header (306) may be collectively referred to as an outer header (232).

The VXLAN frame may include other components without departing from the invention.

Figure 3A:
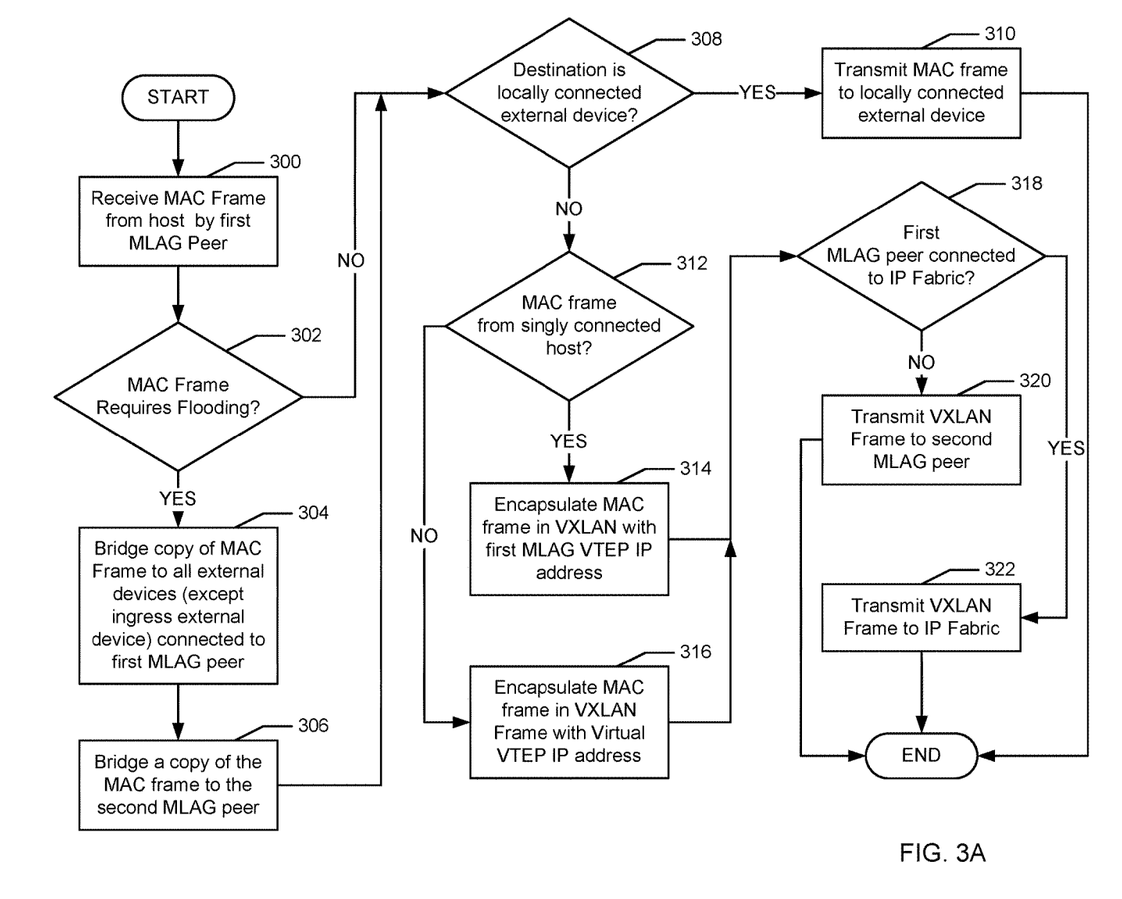
FIGS. 3A-3C show flowcharts for processing MAC frames and VXLAN frames by in an MLAG domain in accordance with one or more embodiments of the invention.
Figure 3B:
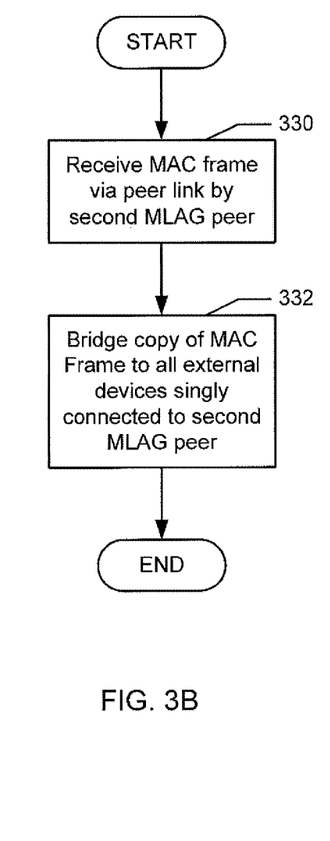
Figure 3C:
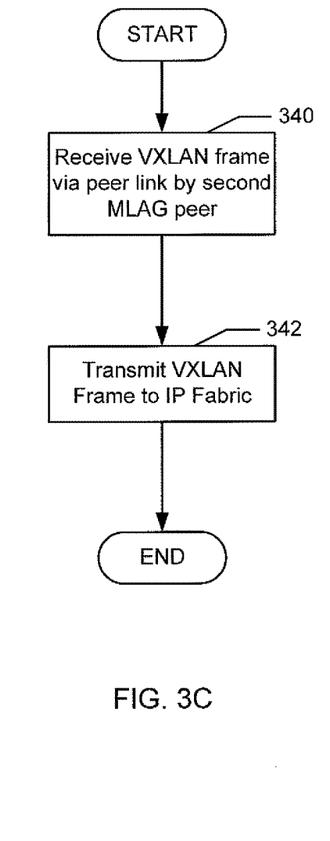

FIGS. 3A-3C show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIGS. 3A-3C may be performed in parallel with any other steps shown in FIGS. 3A-3C without departing from the invention.

Turning to FIG. 3A, FIG. 3A shows a method for processing an ingress MAC frame received from an external device by a MLAG peer in the MLAG domain. In Step 300, a MAC frame is received from an external device by an MLAG Peer (denoted as the first MLAG Peer in the FIGS. 3A-3C). In Step 302, a determination is made about whether the MAC frame requires flooding. In one embodiment of the invention, the MAC frame is flooded to all external devices connected to the MLAG domain when the destination MAC address in the MAC frame is unknown, e.g., there is no corresponding entry in the forwarding table of the first MLAG Peer. If the MAC frame requires flooding, then the process proceeds to the Step 304; otherwise, the process proceeds to Step 308.

In Step 304, a copy of the MAC frame is bridged to all external devices connected to the first MLAG peer (except for the external device that sent the MAC frame in Step 300). In Step 306, a copy of the MAC frame is bridged to the second MLAG peer, i.e., the other MLAG peer in the MLAG domain, via the peer link. The processing of the copy of the MAC frame received by the second MLAG peer is described in FIG. 3B.

In Step 308, a determination is made about whether the MAC frame destination is a locally-connected external destination (i.e., an external device that is directly connected to the one of the MLAG peers in the MLAG domain). If the MAC frame destination is a locally-connected external destination, then the process proceeds to step 310; otherwise, the process proceeds to step 312.

In step 310, the MAC frame is transmitted to the locally-connected external device either (i) directly from the first MLAG peer that received MAC frame or (ii) directly from the second MLAG peer in the MLAG domain, where the MAC frame is bridged from the first MLAG peer to the second MLAG peer via the peer link prior to being transmitted to the locally-connected external device. The process then ends.

Returning to step 308, if the MAC frame destination is not a locally-connected external destination (i.e., the destination is a remote external device), then in step 312, a determination is made about whether the MAC frame (received in Step 300) was received from a singly-connected external device, i.e., an external device that is only connected to the first MLAG Peer. If the MAC frame was received from a singly-connected external device, the process proceeds to Step 314; otherwise, the process proceeds to Step 316. In one embodiment of the invention, a remote external device is an external device that is not directly connected to the MLAG domain; rather, it is indirectly connected to the MLAG domain via the IP fabric. Said another way, a remote external device may be any external device that is not a locally-connected external device.

In Step 314, the MAC frame is encapsulated in a VXLAN frame (see e.g., FIG. 2), where the source VTEP IP address is the first MLAG VTEP IP address, i.e., the IP address of the VTEP that is executing on the first MLAG Peer. The generation of the VXLAN frame requires the first MLAG Peer to determine the next hop MAC address in the outer of the VXLAN frame (202 in FIG. 2). The next hop MAC address is determined using a routing table that is stored in and maintained by the first MLAG Peer. The next hop MAC address may correspond to a network device in the IP fabric, where the network device is directly connected to the first MLAG Peer. Alternatively, the next hop MAC address may correspond to the second MLAG Peer.

In one embodiment of the invention, the next hop MAC address corresponds to a network device in the IP fabric when the first MLAG Peer is connected to the IP Fabric. Alternatively, the next hop MAC address corresponds to the second MLAG Peer when the first MLAG Peer is not connected to the IP Fabric. The process then proceeds to Step 318.

In Step 316, the MAC frame is encapsulated in a VXLAN frame (see e.g., FIG. 2), where the source VTEP IP address is the Virtual VTEP IP address, i.e., the IP address of the Virtual VTEP associated with the MLAG domain. The VXLAN frame is generated in the same manner as the VXLAN frame that is generated in Step 314. The process then proceeds to Step 318.

While steps 316 and 318 have been described as generating a single VXLAN frame, embodiments of the invention may be extend to include the generation of multiple VXLAN frames in steps 316 and/or 318. In such embodiments, each of the generated VXLAN frames is processed in accordance with (i) steps 318-322 and (ii) steps 340-342 (if applicable).

Continuing with the discussion of FIG. 3A, in Step 318, a determination is made about whether to transmit the VXLAN frame (generated in Step 314 or 316) directly to the IP Fabric or to the second MLAG Peer. The determination in Step 318 is based on the next hop MAC address in the outer header of the VXLAN frame. If the VXLAN frame is to be transmitted to the second MLAG Peer, the process proceeds to Step 320. If the VXLAN frame is to be transmitted to the IP Fabric, the process proceeds to Step 322.

In Step 320, the VXLAN frame is transmitted to the second MLAG Peer via the peer link. The processing of the VXLAN frame transmitted to the second MLAG Peer is described in FIG. 3C.

In Step 322, the VXLAN frame is transmitted to a network device in the IP fabric that corresponds to the next hop MAC address in the outer header of the VXLAN frame, where the VXLAN frame is transmitted out of an egress port on the first MLAG peer where the first MLAG Peer is directly connected to the network device via the egress port.

FIG. 3B shows a method for processing MAC frames received by an MLAG peer over a peer link. In Step 330, the copy of the MAC frame is received via the peer link. In Step 332, a copy of the MAC frame received in Step 330 is bridged to all external devices that are singly-connected to the second MLAG peer. The second MLAG peer does not process the MAC frame received via the peer link using the VXLAN protocol.

FIG. 3C shows a method for processing VXLAN frames received by an MLAG peer over a peer link. In Step 340, the VXLAN frame is received via peer link. In Step 342, the VXLAN frame is transmitted to the next hop, e.g., network device in the IP fabric that is directly connected to the second MLAG peer, via an IP forward action. More specifically, in one embodiment of the invention, transmitting the VXLAN frame includes generating a rewritten VXLAN Frame and then transmitting the rewritten VXLAN frame, where the outer Ethernet header in the VXLAN frame (e.g., 232 in FIG. 2) is rewritten to include the second MLAG Peer MAC address as the source MAC address (e.g., 210 in FIG. 2) and the MAC address of a network device in the IP Fabric as the next hop MAC address (e.g., 212 in FIG. 2). The rewriting of the outer Ethernet header in the VXLAN frame may be performed using the routing table on the second MLAG peer and the routing protocol implemented on the second MLAG peer. Once the outer Ethernet header is rewritten to obtain an updated VXLAN frame, the updated VXLAN frame is transmitted to the network device associated with the next hop MAC address.

Figure 4A:
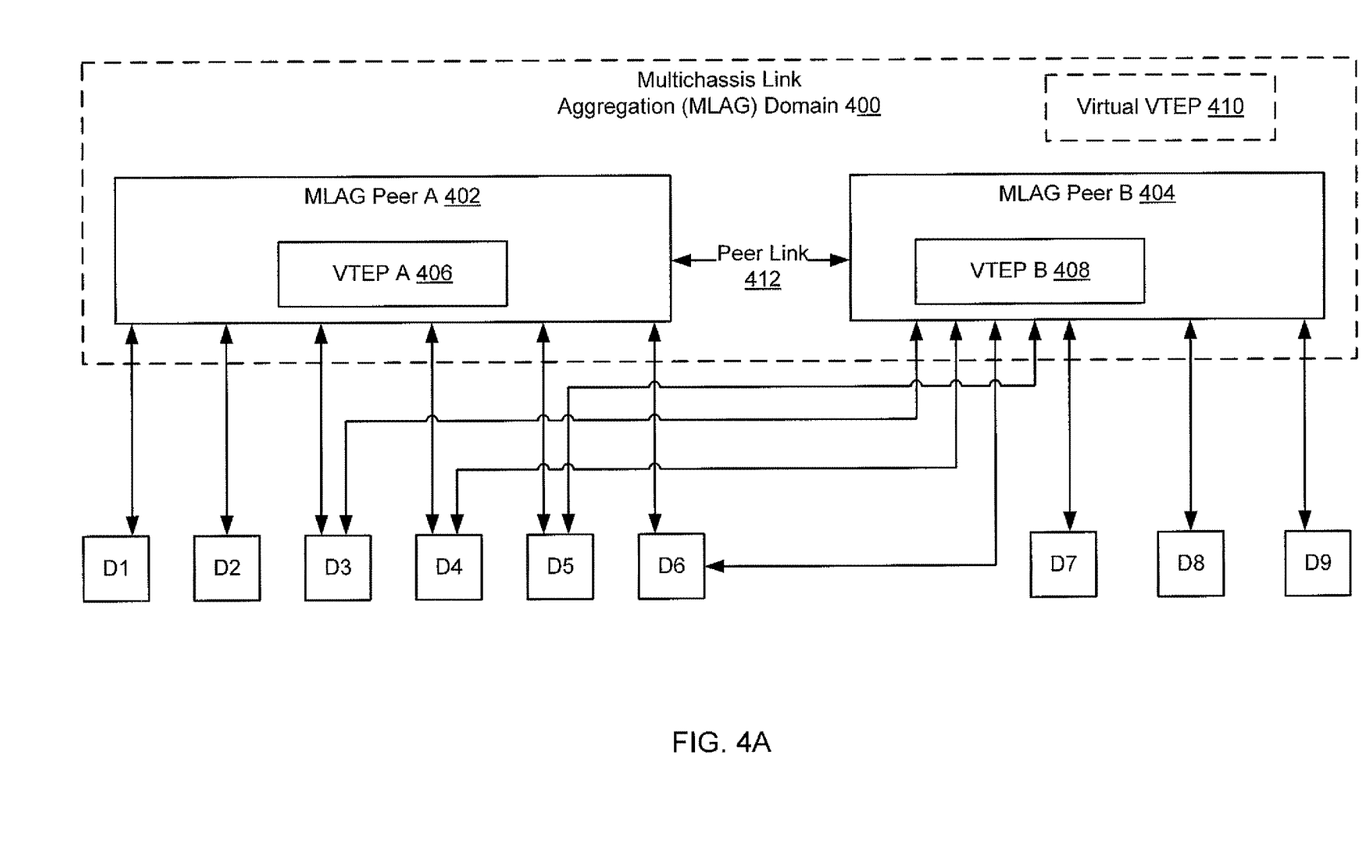
FIGS. 4A-4D show examples in accordance with one or more embodiments of the invention.
Figure 4B:
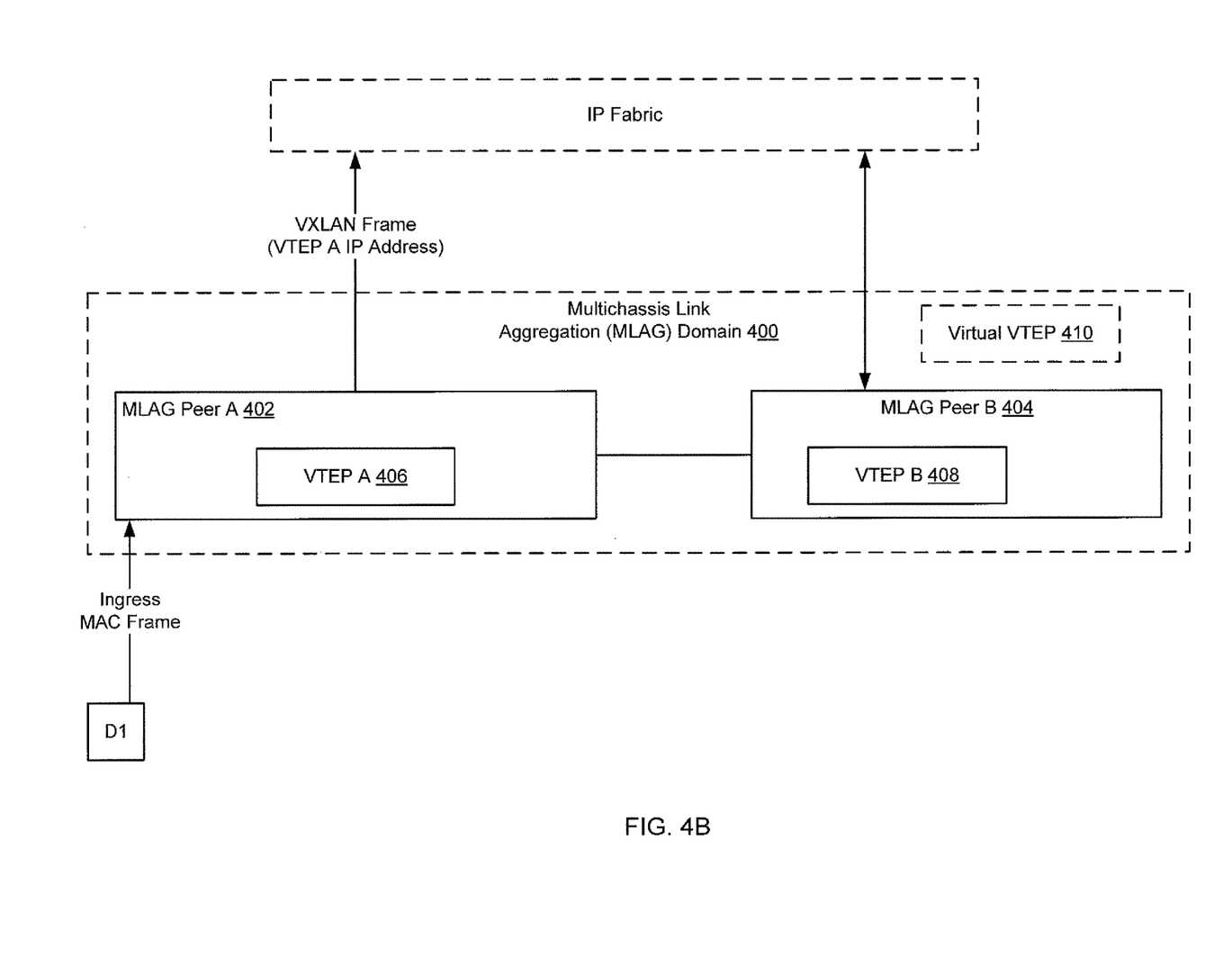
Figure 4C:
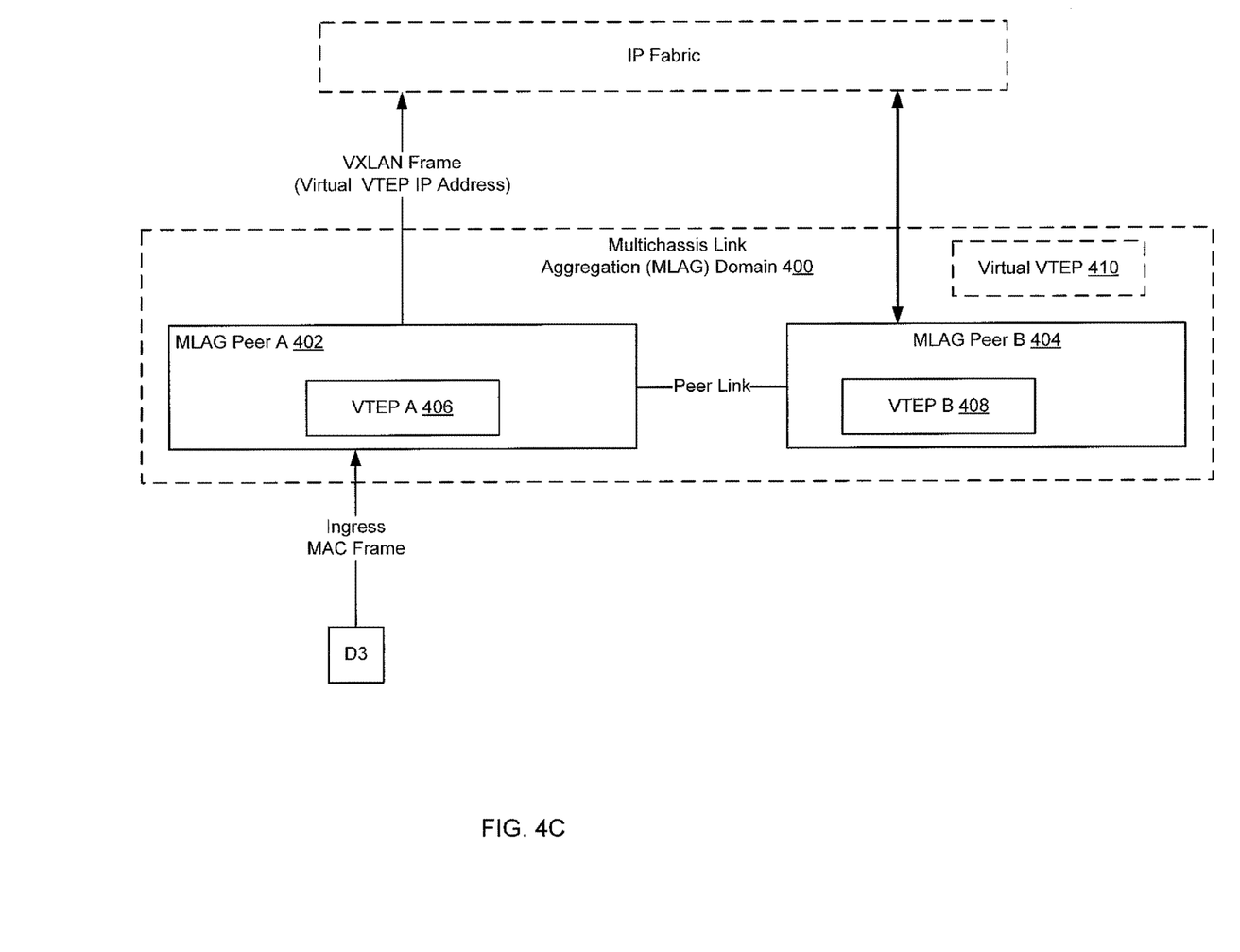
Figure 4D:
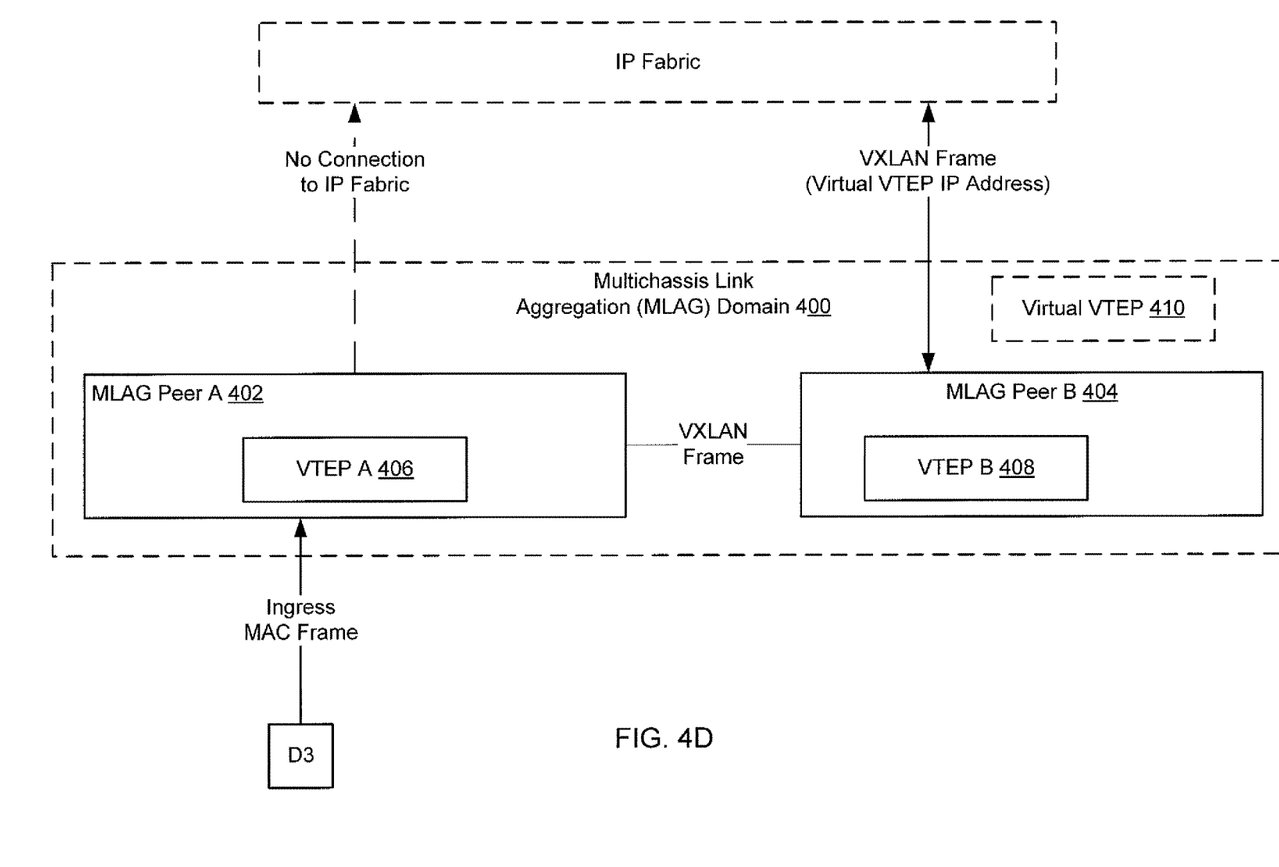

FIGS. 4A-4D show examples in accordance with one or more embodiments of the invention. The examples are not intended to limit the scope of the invention. The examples described in FIGS. 4B-4D are shown based on the system shown in FIG. 4A.

Turning to FIG. 4A, consider the scenario in which an MLAG domain (400) includes MLAG Peer A (402) and MLAG Peer B (404), where external devices D3-D6 are dually-connected devices while external devices D1 and D2 are singly-connected devices connected to MLAG Peer A, and external devices D7-D9 are singly-connected devices connected to MLAG Peer B. Further, VTEP A (406) is located on MLAG Peer A and VTEP B (408) is located on MLAG Peer B. Finally, the MLAG domain (400) is associated with a virtual VTEP (410). Each of the aforementioned VTEPs is associated with at least its own distinct IP address.

Referring to FIG. 4B, consider a scenario in which an ingress MAC frame is received by MLAG Peer A from external device D1 and that both MLAG peers in the MLAG domain are directly connected to the IP Fabric. Upon receipt of the ingress MAC frame, MLAG Peer A determines that the ingress MAC frame needs to be transmitted to a remote external device (not shown) via the IP fabric.

Based on the above determination, MLAG Peer A, using VTEP A, generates a VXLAN frame that encapsulates the ingress MAC frame. The generated VXLAN Frame includes VTEP A IP address as the source VTEP IP address and a next hop MAC address corresponding to a network device (not shown) in the IP Fabric that is directly connected to MLAG Peer A. The VXLAN frame is subsequently transmitted directly to the IP Fabric.

The VTEP A IP address is used (instead of the virtual VTEP IP address) in the VXLAN frame because the ingress MAC frame was received from a singly-connected external device. The use of the VTEP A IP address ensures that any VXLAN frames that include MAC frames destined for external device D1 are received by MLAG Peer A.

If the Virtual VTEP IP address was used in the VXLAN frame, any VXLAN frames that include MAC frames destined for external device D1 would be either received by MLAG Peer A or MLAG Peer B (based on, for example, ECMP). As a result, if a VXLAN frame that includes a MAC frame for external device D1 is received by MLAG Peer B, MLAG Peer B would have to extract the MAC frame from the received VXLAN frame and then send the packet to MLAG Peer A via the peer link. Upon receipt of the MAC frame via the peer link, MLAG Peer A would subsequently bridge the MAC frame to external device D1. Accordingly, the use of the Virtual VTEP IP address in the example shown in FIG. 4B would result in extra processing by the MLAG domain as compared with using the VTEP A IP address.

Referring to FIG. 4C, consider a scenario in which an ingress MAC frame is received by MLAG Peer A from external device D3 and that both MLAG peers in the MLAG domain are directly connected to the IP Fabric. Upon receipt of the ingress MAC frame, MLAG Peer A determines that the ingress MAC frame needs to be transmitted to a remote external device (not shown) via the IP fabric.

Based on the above determination, MLAG Peer A, using VTEP A, generates a VXLAN frame that encapsulates the ingress MAC frame. The generated VXLAN Frame includes the Virtual VTEP IP address as the source VTEP IP address and a next hop MAC address corresponding to a network device (not shown) in the IP Fabric that is directly connected to MLAG Peer A. The VXLAN frame is subsequently transmitted directly to the IP Fabric.

The Virtual VTEP IP address is used (instead of the VTEP A IP address) in the VXLAN frame because the ingress MAC frame was received from an external device that is connected to both MLAG peers in the MLAG domain. The use of the Virtual VTEP IP address ensures, any VXLAN frames that include MAC frames destined for external device D3 would be either received by MLAG Peer A or MLAG Peer B (based on, for example, ECMP). As a result, if a VXLAN frame that includes a MAC frame for external device D3 is received by MLAG Peer A, MLAG Peer A would have to extract the MAC frame from the received VXLAN frame and then send the packet to directly to external device D3. Similarly, if a VXLAN frame that includes a MAC frame for external device D3 is received by MLAG Peer B, MLAG Peer B would have to extract the MAC frame from the received VXLAN frame and then send the packet to directly to external device D3. Accordingly, the use of the Virtual VTEP IP address in the example shown in FIG. 4C allows loading balancing of VXLAN processing across the MLAG peers in the MLAG Domain for VXLAN frames that include MAC frames destined for external device D3.

Referring to FIG. 4D, consider a scenario in which an ingress MAC frame is received by MLAG Peer A from external device D3 and only MLAG Peer B in the MLAG domain is directly connected to the IP Fabric. Upon receipt of the ingress MAC frame, MLAG Peer A determines that the ingress MAC frame needs to be transmitted to a remote external device (not shown) via the IP fabric.

Based on the above determination, MLAG Peer A, using VTEP A, generates a VXLAN frame that encapsulates the ingress MAC frame. The generated VXLAN Frame includes the Virtual VTEP IP address as the source VTEP IP address and a next hop MAC address corresponding to MLAG Peer B. The VXLAN frame is subsequently transmitted directly to the IP Fabric.

The Virtual VTEP IP address is used (instead of the VTEP A IP address) in the VXLAN frame because the ingress MAC frame was received from an external device that is connected to both MLAG peers in the MLAG domain. The use of the Virtual VTEP IP address ensures, any VXLAN frames that include MAC frames destined for external device D3 would be either received by MLAG Peer A or MLAG Peer B (based on, for example, ECMP). As a result, if a VXLAN frame that includes a MAC frame for external device D3 is received by MLAG Peer A, MLAG Peer A would have to extract the MAC frame from the received VXLAN frame and then send the packet to directly to external device D3. Similarly, if a VXLAN frame that includes a MAC frame for external device D3 is received by MLAG Peer B, MLAG Peer B would have to extract the MAC frame from the received VXLAN frame and then send the packet to directly to external device D3. Accordingly, the use of the Virtual VTEP IP address in the example shown in FIG. 4D allows loading balancing of VXLAN processing across the MLAG Peers in the MLAG Domain for VXLAN frames that include MAC frames destined for external device D3.

However, unlike the example in FIG. 4C, in the example shown in FIG. 4D, because MLAG Peer A is not connected to the IP Fabric, e.g., the link between MLAG Peer A and the IP Fabric is down, the routing table in MLAG Peer A indicates that the next hop is MLAG Peer B. As a result, the VXLAN Frame is transmitted MLAG Peer B via the peer link. MLAG Peer B, upon receipt of the VXLAN frame, processes the VXLAN frame as described in FIG. 3C, which includes rewriting the outer Ethernet header of the VXLAN frame and then transmitting the VXLAN frame to the IP Fabric.

Embodiments of the invention enable VTEP redundancy in an MLAG domain. As a result, the switches in the MLAG domain may continue to implement VXLAN provided that at least one VTEP is executing in the MLAG domain and at least one switch in the MLAG domain is connected to the IP fabric.

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, comprising functionality to:
   receive, by a first switch in a multichassis link aggregation (MLAG) domain, a first media access control (MAC) frame from an external device, wherein the external device is directly connected to the first switch, wherein the MLAG domain consists of the first switch and a second switch;
   make a first determination that the external device is not a singly-connected external device;
   based on the first determination, encapsulate the first MAC frame in a first Virtual Extensible Local Area Network (VXLAN) frame using a first virtual tunnel endpoint (VTEP), wherein the first VXLAN frame comprises a virtual VTEP Internet Protocol (IP) address, wherein the virtual VTEP IP address is associated with the MLAG domain; and
   transmit the first VXLAN frame to an IP fabric, wherein the first switch is directly connected to the IP fabric.

2. The non-transitory computer readable medium of claim 1, further comprising instructions, comprising functionality to:
   receive, by the first switch in the MLAG domain, a second MAC frame from a second external device, wherein the second external device is directly connected to the first switch;
   make a second determination that the second external device is a singly-connected external device;
   based on the second determination, encapsulate the second MAC frame in a second VXLAN frame using the first VTEP, wherein the second VXLAN frame comprises a first VTEP IP address, wherein the first VTEP IP address is associated with the first VTEP; and
   transmit the second VXLAN frame to the IP fabric.

3. The non-transitory computer readable medium of claim 1, further comprising instructions, comprising functionality to:
   receive, by the first switch in the MLAG domain, a second MAC frame from a second external device, wherein the second external device is directly connected to the first switch;
   make a second determination that the second external device is not a singly-connected external device;
   based on the second determination, encapsulate the second MAC frame in a second VXLAN frame, wherein the second VXLAN frame comprises the virtual VTEP IP address; and
   transmit the second VXLAN frame to the second switch, wherein the first switch is not directly connected to the IP fabric, and wherein the second switch is configured to rewrite an outer Ethernet header of the second VXLAN frame to obtain a third VXLAN frame and transmit the third VXLAN frame to the IP fabric.

4. The non-transitory computer readable medium of claim 3, wherein the second VXLAN frame is transmitted to the second switch using a peer link, wherein the peer link comprises a physical link between the first switch and the second switch.

5. The non-transitory computer readable medium of claim 1, further comprising instructions, comprising functionality to:
   receive, by the first switch in the MLAG domain, a second MAC frame from a second external device, wherein the second external device is directly connected to the first switch;
   make a second determination that the second external device is a singly-connected external device;
   based on the second determination, encapsulate the second MAC frame in a second VXLAN frame, wherein the second VXLAN frame comprises a first VTEP IP address, wherein the first VTEP IP address is associated with the first VTEP; and
   transmit the second VXLAN frame to the second switch, wherein the first switch is not directly connected to the IP fabric, and wherein the second switch is configured to rewrite an outer Ethernet header of the second VXLAN frame to obtain a third VXLAN frame and transmit the third VXLAN frame to the IP fabric.

6. The non-transitory computer readable medium of claim 1, wherein the first switch is configured to send a copy of a MAC frame received from a first external device to all other external devices that are directly connected to the first switch when the MAC frame is to be flooded.

7. The non-transitory computer readable medium of claim 6, wherein first switch is configured to send a copy of the MAC frame to the second switch when the MAC frame is to be broadcast.

8. The non-transitory computer readable medium of claim 1, wherein the second switch comprises a second VTEP, wherein the second VTEP is associated with a second VTEP IP address.

9. The non-transitory computer readable medium of claim 8, wherein the second VTEP is configured to encapsulate MAC frames received from external devices directly connected to the second switch in VXLAN frames comprising at least one selected from a group consisting of the virtual VTEP IP address and the second VTEP IP address.

10. The non-transitory computer readable medium of claim 9, wherein the first VTEP cannot encapsulate MAC frames received from external devices directly connected to the first switch in VXLAN frames comprising the second VTEP IP address.

11. A method for transmitting MAC frames, comprising:
    receiving, by a first switch in the MLAG domain, a first media access control (MAC) frame from an external device, wherein the external device is directly connected to the first switch, wherein the MLAG domain consists of the first switch and a second switch;
    making a first determination that the external device is not a singly-connected external device;
    based on the first determination, encapsulating the first MAC frame in a first VXLAN frame using a first virtual tunnel endpoint (VTEP), wherein the first VXLAN frame comprises a virtual VTEP Internet Protocol (IP) address, wherein the virtual VTEP IP address is associated with the MLAG domain; and
    transmitting the first VXLAN frame to an IP fabric, wherein the first switch is directly connected to the IP fabric.

12. The method of claim 11, further comprising:
receiving, by the first switch in the MLAG domain, a second MAC frame from a second external device, wherein the second external device is directly connected to the first switch;
making a second determination that the second external device is a singly-connected external device;
based on the second determination, encapsulating the second MAC frame in a second VXLAN frame using the first VTEP, wherein the second VXLAN frame comprises a first VTEP IP address, wherein the first VTEP IP address is associated with the first VTEP; and
transmitting the second VXLAN frame to the IP fabric.

13. The method of claim 11, further comprising:
receiving, by the first switch in the MLAG domain, a second MAC frame from a second external device, wherein the second external device is directly connected to the first switch;
making a second determination that the second external device is not a singly-connected external device;
based on the second determination, encapsulating the second MAC frame in a second VXLAN frame, wherein the second VXLAN frame comprises the virtual VTEP IP address; and
transmitting the second VXLAN frame to the second switch, wherein the first switch is not directly connected to the IP fabric, and wherein the second switch is configured to rewrite an outer Ethernet header of the second VXLAN frame to obtain a third VXLAN frame and transmit the third VXLAN frame to the IP fabric.

14. The method of claim 13, wherein the second VXLAN frame is transmitted to the second switch using a peer link, wherein the peer link comprises a physical link between the first switch and the second switch.

15. The method of claim 11, further comprising:
receiving, by the first switch in the MLAG domain, a second MAC frame from a second external device, wherein the second external device is directly connected to the first switch;
making a second determination that the second external device is a singly-connected external device;
based on the second determination, encapsulating the second MAC frame in a second VXLAN frame, wherein the second VXLAN frame comprises a first VTEP IP address, wherein the first VTEP IP address is associated with the first VTEP; and
transmitting the second VXLAN frame to the second switch, wherein the first switch is not directly connected to the IP fabric, and wherein the second switch is configured to rewrite an outer Ethernet header of the second VXLAN frame to obtain a third VXLAN frame and transmit the third VXLAN frame to the IP fabric.

16. The method of claim 11, wherein first switch is configured to send a copy of a MAC frame received from a first external device to all other external devices that are directly connected to the first switch when the MAC frame is to be flooded.

17. A multichassis link aggregation (MLAG) domain, comprising:
a first switch comprising a first virtual tunnel endpoint associated with a first VTEP Internet Protocol (IP) address;
a second switch comprising a second VTEP associated with a second VTEP IP address;
a virtual VTEP associated with a virtual VTEP IP address;
wherein the first switch is configured to:
receive, a first media access control (MAC) frame from an external device, wherein the external device is directly connected to the first switch;
make a first determination that the external device is not a singly-connected external device;
based on the first determination, encapsulate the first MAC frame in a first VXLAN frame using a first VTEP, wherein the first VXLAN frame comprises the virtual VTEP IP address; and
transmit the first VXLAN frame to an IP fabric, wherein the first switch is directly connected to the IP fabric.

18. The MLAG domain of claim 17, wherein the first switch is further configured to:
receive a second MAC frame from a second external device, wherein the second external device is directly connected to the first switch;
make a second determination that the second external device is a singly-connected external device;
based on the second determination, encapsulate the second MAC frame in a second VXLAN frame using the first VTEP, wherein the second VXLAN frame comprises a first VTEP IP address; and
transmit the second VXLAN frame to the IP fabric.

19. The MLAG domain of claim 17,
wherein the first switch is further configured to:
receive, by the first switch in the MLAG domain, a second MAC frame from a second external device, wherein the second external device is directly connected to the first switch;
make a second determination that the second external device is not a singly-connected external device;
based on the second determination, encapsulate the second MAC frame in a second VXLAN frame, wherein the second VXLAN frame comprises the virtual VTEP IP address; and
transmit the second VXLAN frame to the second switch, wherein the first switch is not directly connected to the IP fabric; and
wherein the second switch is configured to:
receive the second VXLAN frame from the first switch;
rewrite an outer Ethernet header of the second VXLAN frame to obtain a third VXLAN frame; and
transmit the third VXLAN frame to the IP fabric.

20. The MLAG domain of claim 17,
wherein the first switch is further configured to:
receive, by the first switch in the MLAG domain, a second MAC frame from a second external device, wherein the second external device is directly connected to the first switch;
make a second determination that the second external device is a singly-connected external device;
based on the second determination, encapsulate the second MAC frame in a second VXLAN frame, wherein the second VXLAN frame comprises the first VTEP IP address; and
transmit the second VXLAN frame to the second switch, wherein the first switch is not directly connected to the IP fabric; and
wherein the second switch is configured to:
receive the second VXLAN frame from the first switch;
rewrite an outer Ethernet header of the second VXLAN frame to obtain a third VXLAN frame; and
transmit the third VXLAN frame to the IP fabric.

* * * * *